United States Patent
Arankalle et al.

(10) Patent No.: US 8,220,062 B1
(45) Date of Patent: Jul. 10, 2012

(54) DOUBLE SAND-BOXING FOR FLASH LIBRARY

(75) Inventors: Poorva Arankalle, Redmond, WA (US); Wesley Carr, Seattle, WA (US)

(73) Assignee: Google Inc., Mountain View, CA (US)

(*) Notice: Subject to any disclaimer, the term of this patent is extended or adjusted under 35 U.S.C. 154(b) by 836 days.

(21) Appl. No.: 12/193,412

(22) Filed: Aug. 18, 2008

Related U.S. Application Data

(60) Provisional application No. 60/956,247, filed on Aug. 16, 2007.

(51) Int. Cl.
   *G06F 21/00* (2006.01)
(52) U.S. Cl. .......... 726/27; 709/217; 709/218; 709/219; 705/14.72; 705/14.73; 705/14.4; 705/14.49; 713/167
(58) Field of Classification Search .................... 726/27; 705/14, 14.72, 14.73, 14.4, 14.49; 709/717–719; 713/167
   See application file for complete search history.

(56) References Cited

U.S. PATENT DOCUMENTS

| 7,913,248 | B1* | 3/2011 | Lynch et al. ................. 717/174 |
| 2003/0182402 | A1* | 9/2003 | Goodman et al. ............ 709/220 |
| 2005/0256766 | A1* | 11/2005 | Garcia et al. .................... 705/14 |
| 2008/0021775 | A1* | 1/2008 | Lerman et al. .................. 705/14 |
| 2008/0301796 | A1* | 12/2008 | Holostov et al. ................ 726/12 |
| 2008/0313648 | A1* | 12/2008 | Wang et al. .................... 719/315 |

OTHER PUBLICATIONS

Testing Flash Applications, Stefano Di Paola, 6th OWASP AppSec Conference, Milan-May 2007.*

* cited by examiner

*Primary Examiner* — Carl Colin
*Assistant Examiner* — Mohammad Siddiqi
(74) *Attorney, Agent, or Firm* — Fish & Richardson P.C.

(57) ABSTRACT

A Flash advertisement is provided, and access to sensitive data associated with the Flash advertisement is restricted. First library code is stored at a first security domain, the first library code to control playback of the Flash advertisement; and second library code is stored at a second security domain, the second library code to access the sensitive data. An application at a third security domain is permitted to access the first library code, and only code residing at the first security domain is permitted to access the second library code.

21 Claims, 6 Drawing Sheets

DOUBLE SAND-BOXING FOR FLASH LIBRARY

RELATED APPLICATION

This application claims priority to U.S. Provisional Patent Application Ser. No. 60/956,247, filed Aug. 16, 2007, the contents of which are incorporated by reference.

TECHNICAL FIELD

This document generally relates to information management.

BACKGROUND

On-line advertisements (or "ads") allow advertisers to reach a wide range of viewers through the Internet. Ads can be played as part of video programs. The video program and the ad can be, for example, Flash videos that comply with Flash video standards promoted by Adobe Corporation, San Jose, Calif. Code for playing the video program and the ad can be in the format of SWF files that can be executed by a Flash player, such as Adobe Flash Player.

The Flash Player has security features based on sandboxes, which are logical security groupings that are used to contain resources. The security sandboxes define the range of data and operations that each Flash application may access. The Flash Player assigns SWF files to sandboxes based on their origin, and sandbox boundaries are determined by Internet domains or, for local SWF files, on the class of the local SWF file. The Flash Player runs SWF files from the Internet in separate sandboxes that correspond to their origin domains. Two SWF files that run in the same sandbox (for example, two SWF files downloaded from the same network domain) may interact with each other. SWF files may also interact with SWF files from other sandboxes in accordance with specific security rules and configuration settings.

SUMMARY

This document describes a system for allowing ad servers to provide Flash ads without exposing sensitive data. In general, in one aspect, a Flash advertisement is provided, and access to sensitive data associated with the Flash advertisement is restricted. First library code is stored at a first security domain, the first library code to control playback of the Flash advertisement; and second library code is stored at a second security domain, the second library code to access the sensitive data. An application at a third security domain is permitted to access the first library code, and only code residing at the first security domain is permitted to access the second library code.

Implementations may include one or more of the following features. A first set of application programming interfaces (APIs) for calling the first library code is provided, and applications at the third security domain are permitted to use the first set of APIs. A second set of APIs for calling the second library code is provided, and only applications at the first security domain are permitted to use the second set of APIs to call the second library code. Permitting only applications at the first security domain to use the second set of APIs includes using a Security.allowDomain( )method to permit only applications belonging the first security domain to use the second set of APIs. The second library code includes code for reporting performance statistics of the advertisement. Providing the Flash advertisement includes streaming a video advertisement.

In general, in another aspect, a first Flash file for playing a Flash advertisement is provided, the first Flash file including a first set of application programming interfaces (APIs) for calling first library code belonging to a first security domain, the first Flash file allowing applications in a plurality of domains to use the first set of APIs to call the first library code. A second Flash file for accessing data related to the Flash advertisement is provided, the second Flash file including a second set of APIs for calling second library code belonging to a second security domain, the second Flash file allowing only code belonging to the first security domain to use the second set of APIs to call the second library code.

Implementations may include one or more of the following features. The first Flash file includes an API for at least one of playing, pausing, or stopping the advertisement, or resizing a display area for showing the advertisement. The second Flash file includes an API for accessing performance statistics of the advertisement and/or an API for accessing an URL of the advertisement. The advertisement includes at least one of video or animation. Providing the first and second Flash files includes providing SWF files. A third Flash file is provided for showing a video program or animation program, in which the third Flash file includes code for playing the advertisement.

In general, in another aspect, at a client location, a first Flash file that is transmitted over a network is received, the first Flash file originally residing at a first domain, the client location being outside of the first domain. An application at the client location is permitted to access a first set of application programming interfaces (APIs) related to playback of an advertisement. A second Flash file is received, the second Flash file only permitting code at the first domain to use a second set of APIs related to access of information about the advertisement. The advertisement is played by using the first set of APIs.

In general, in another aspect, an advertisement is allowed to be played while access to sensitive data related to the advertisement is limited. A first Flash file residing at a first domain is provided, the first Flash file including a first set of application programming interfaces (APIs) for controlling playback of the advertisement. A second Flash file residing at a second domain is provided, the second Flash file including a second set of APIs for accessing the sensitive data related to the advertisement, the second Flash file permitting only code at the first domain to use the second set of APIs.

In general, in another aspect, a Flash player loads a first Flash file that includes code for loading a second Flash file and a third Flash file, the second Flash file residing at a location belonging to a trusted domain. Code in the second Flash file is executed to permit the Flash player to use a first set of application programming interfaces (APIs) specified in the second Flash file, code in the third Flash file is executed to permit only code in the trusted domain to use a second set of APIs specified in the third Flash file, and code in the first Flash file is executed to play a program. The first set of APIs is used to play an advertisement, and code in the second Flash file is executed to cause code in the trusted domain to use the second set of APIs to access data related to the advertisement.

In general, in another aspect, a manufacture has encoded thereon a first Flash file for playing a Flash advertisement, the first Flash file including a first set of application programming interfaces (APIs) for calling first library code belonging to a first security domain, the first Flash file allowing applications belonging to a third domain to gain access to the first set of APIs. A manufacture has encoded thereon a second Flash file for accessing data related to the Flash advertisement, the second Flash file including a second set of APIs for calling second library code belonging to a second security domain, the second Flash file allowing only code belonging to the first security domain to use the second set of APIs to access the data.

In general, in another aspect, a first server is provided to host first library code for controlling playback of a Flash advertisement, the first server belonging to a first domain, the first library code being accessible using a first set of application programming interfaces (APIs). A second server is provided to host second library code for accessing sensitive data associated with the advertisement, the second server belonging to a second domain, the second library code being accessible using a second set of APIs, the second library code permitting only code belonging to the first domain to use the second set of APIs to call the second library code.

Implementations may include one or more of the following features. The first set of APIs includes an API for at least one of playing, pausing, or stopping the Flash advertisement. The first set of APIs includes an API for resizing a display area for showing the Flash advertisement. The second set of APIs includes an API for accessing performance statistics of the Flash advertisement. The second set of APIs includes an API for accessing a count value representing a number of times that the advertisement has been viewed. The first Flash file includes code for causing code in the first library code to call the second set of APIs to access data related to the Flash advertisement. The Flash advertisement includes at least one of a video or an animation. The first and second Flash files include SWF files. In some examples, the first server and the second server reside in a single machine. In some examples, the first server and the second server reside in different machines.

In general, in another aspect, a first server provides a first Flash file including a first set of application programming interfaces (APIs) for controlling playback of a Flash advertisement, the first server belonging to a first domain. A second server provides a second Flash file including a second set of APIs for accessing data related to the Flash advertisement, the second Flash file permitting only code at the first domain to gain access to the second set of APIs.

In general, in another aspect, a computer readable medium is provided having instructions encoded thereon, the instructions when executed causes a computer system to provide a first Flash file residing at a location belonging to a first domain, the first Flash file including a first set of application programming interfaces (APIs) for controlling playback of the Flash advertisement, and provide a second Flash file including a second set of APIs for accessing the data related to the Flash advertisement, the second Flash file permitting only applications at the first domain to use the second set of APIs.

In general, in another aspect, a system includes means for providing a first Flash file residing at a location belonging to a first domain, the first Flash file including a first set of application programming interfaces (APIs) for controlling playback of a Flash advertisement; and means for providing a second Flash file including a second set of APIs for accessing the data related to the Flash advertisement, the second Flash file permitting only applications at the first domain to use the second set of APIs.

These and other aspects and features, and combinations of them, may be expressed as methods, apparatus, systems, means for performing functions, program products, and in other ways.

Advantages of the aspects and features include one or more of the following advantages. Flash content (e.g., advertisements) can be embedded in Flash programs provided by third parties, and statistics associated with the Flash content can be collected without exposing sensitive data associated with the Flash content to the third parties. APIs for controlling playback of the Flash content can be exposed to third parties while restricting access to APIs used for reporting sensitive data (e.g., URL of content and statistics about impressions of content) associated with the Flash content. Pre-existing library code intended for Flash files that use the Security.allowDomain( )method can be used for playing the Flash content without exposing sensitive data to third parties.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
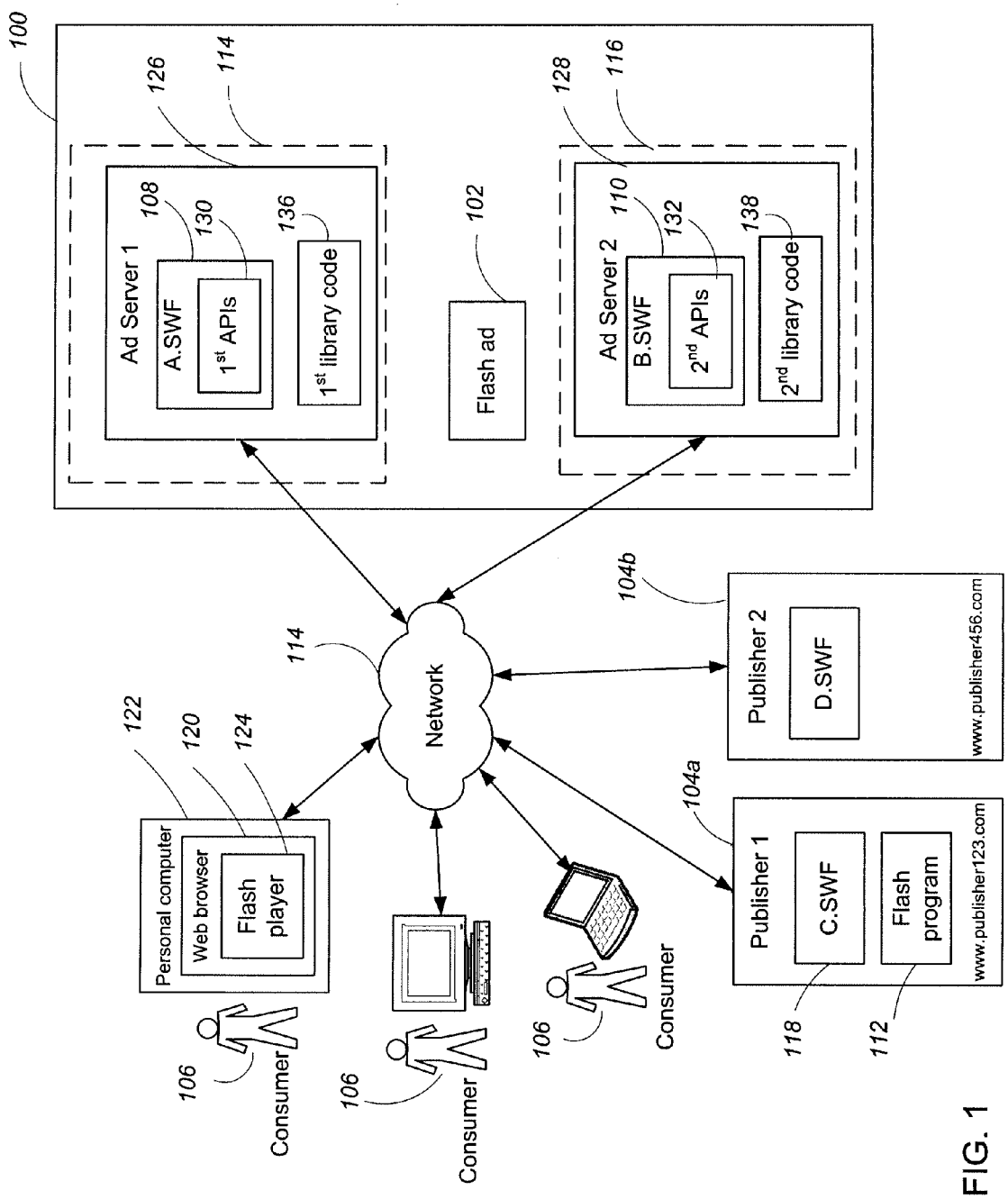
FIG. 1 is a schematic diagram of an example system for providing Flash content.

FIG. 1 is a schematic diagram of an example system 100 for providing Flash content 102, such as Flash advertisements, to third party publishers while limiting access to sensitive data associated with the Flash content 102. The third party publishers 104 (including 104a and 104b, collectively referenced as 104) can incorporate the Flash content 102 into Flash programs 112 and publish the Flash programs 112 for viewing by consumers 106. Restricting access to sensitive data associated with the Flash content 102 is achieved by using separate application programming interfaces (APIs) for accessing the sensitive data from APIs for controlling playback of the Flash content 102.

In the examples below, the Flash content 102 includes a Flash advertisement (or Flash ad) 102, though other types of Flash content 102 can also be used. The Flash files and Flash players are assumed to comply with Adobe Flash specification.

In some implementations, a first Flash file A.SWF 108 belonging to a first security domain 114 (simply referred to as a first domain) (shown in dashed lines) provides a first set of APIs 130 for controlling playback of the Flash ad 102. A second Flash file B.SWF 110 belonging to a second security domain 116 (simply referred to as a second domain) (shown in dashed lines) provides a second set of APIs 132 for accessing sensitive data associated with the Flash ad 102. The first Flash file A.SWF 108 permits applications from all domains to use the first set of APIs 130, whereas the second Flash file B.SWF 110 permits only applications from the first domain 114 to use the second set of APIs 132. The first security domain 114 is a trusted domain to the second set of APIs 132. This allows the publisher 104 to use a third Flash file, e.g., C.SWF 118 to call the first set of APIs 130 to control playback of the Flash ad 102, but prevents the publisher 104 from using the second set of APIs 132 to access the sensitive data associated with the Flash ad 102.

In some examples, the publisher 104 has a web site that includes the Flash file C.SWF 118 having code for enabling playback of a Flash program 112, which incorporates the Flash ad 102. For example, the Flash file C.SWF 118 includes code that loads the Flash program 112 and the Flash file A.SWF 108. The Flash file C.SWF 118 also includes code that uses the first set of APIs 130 to call a first set of library code 136 for controlling playback of the Flash ad 102.

The first Flash file A.SWF 108 defines the first set of APIs 130 and includes code that loads the second Flash file B.SWF 110. The Flash file A.SWF 108 also includes code that uses the second set of APIs 132 defined in B.SWF 110 to call a second set of library code 138 for accessing sensitive data associated with the Flash ad 102. The second Flash file B.SWF 110 defines the second set of APIs 132 and limits access of the second set of APIs 132 to the first domain 114, allowing A.SWF 108 to access the second set of APIs 132 but preventing C.SWF 118 from accessing the second set of APIs 132.

In some examples, the consumer 106 uses a web browser 120 on a personal computer 122 to access a web page hosted on a server of the publisher 104. The web page includes the Flash file C.SWF 118. The web page browser 120 may load a Flash player 124 plug-in to play the Flash file C.SWF 118. The consumer 106 may also launch a Flash player 124 directly without using a web browser. The Flash player 124 has built-in security features based on "sandboxes" that separate resources according "security domains" (or simply referred to as "domains"), such that applications in a first security domain normally cannot access resources in a second security domain unless the resources in the second security domain grant permission.

The example below assumes that a first publisher 104a publishes content on a web site www.publisher123.com, a second publisher 104b publishes content on a web site www.publisher456.com, the Flash file A.SWF 108 resides at a first ad server 126 associated with a web domain www.adserver1.com, and the Flash file B.SWF 110 resides at a second ad sever 128 associated with a web domain www.adserver2.com.

When the Flash player 124 retrieves SWF files from the Internet, the SWF files are assigned security domains based on their origin. For example, SWF files from www.adserver1.com may be assigned to a first security domain, and SWF files from www.adserver2.com may be assigned to a second security domain, SWF files from www.publisher123.com may be assigned to a third security domain, SWF files from www.publisher456.com may be assigned to a fourth security domain, etc. When the Flash player 124 retrieves A.SWF 108, B.SWF 110, and C.SWF 118, the Flash player 124 recognizes that the SWF files 108, 110, and 118 belong to different domains, and places each of the SWF files 108, 110, and 118 in a separate sandbox.

A resource from one security domain can grant permission to applications in another security domain by using, e.g., an API Security.allowDomain( )method according to the Adobe Flash specification. The SWF files associated with the Flash ad 102 are written such that the first set of APIs 130 used to control playback of the Flash ad 102 are exposed to third parties (e.g., 104), while the second set of APIs 132 used to access (e.g., report or modify) sensitive data associated with the Flash ad 102 are not exposed to the third parties.

A first layer of protection is provided to the second set of APIs 132 for accessing sensitive data because B.SWF 110 controls the domain that can access the second set of APIs 132. A second layer of protection is provided because A.SWF 110 controls which APIs are exposed to third parties. This protection scheme can be viewed as "double-sandboxing", in which A.SWF 108 is placed in a first sandbox, and B.SWF 110 is placed in a second sandbox within the first sandbox.

The first set of APIs 130 that are used to control playback of the Flash ad 102 may include, e.g., APIs for loading, playing, pausing, and ending the Flash ad 102, an API for obtaining the current playing position, and an API for obtaining the total length of the Flash ad 102, etc. The second set of APIs 132 that are used to access sensitive data may include, e.g., an API for obtaining the URL of the Flash ad 102, an API for obtaining the URL for reporting statistics about impressions of the Flash ad 102, and an API for obtaining the clickstring used for reporting the statistics.

In some examples, the Flash file A.SWF 108 defines APIs that are used to control playback of the Flash ad 102. The Flash file A.SWF 108 includes a script
Security.allowDomain(target._parent.url)
to permit applications from all security domains to use the APIs defined in A.SWF 108. The B.SWF file 110 defines APIs that are used to access the sensitive data associated with the Flash ad 102. The Flash file B.SWF 110 includes a script
Security.allowDomain(www.adserver1.com)
to permit only applications from the domain www.adserver1.com to use the APIs defined in B.SWF 110. The scripts can be written as, e.g., ActionScript, a scripting language used for the development of websites and software using the Adobe Flash Player platform.

Table 1 is a listing of example pseudocode for the Flash file A.SWF 108 that includes definitions for the first set of APIs 130 for controlling playback of the Flash ad 102.

TABLE 1

```
===================================================
System.security.allowDomain(target._parent.url)
// On either success or failure the function provided in the param
// 'callback' will be called with an object that contains the following
// fields:
// success - A Boolean value indicating success or failure.
// ads - If success=true, an Array of GAdInfo objects representing the
//        ads to display.
public function requestAds(params:Object, callback:Function):Void;
}
interface com.google.ads.GAdInfo {
// Creates a video player MovieClip to play the video ad. The MovieClip
// is created as a child of the MovieClip into which the googleadslibrary
// swf was loaded.
// The returned MovieClip conforms to the com.google.ads.GAdPlayer
// interface.
public function getAdPlayerMovieClip( ):MovieClip;
}
interface com.google.ads.GAdPlayer {
// Loads the ad video, begins buffering it, and leaves it in a paused
// state. Playback will not start until play( ) has been called.
public function load( ):Void;
// Begins or resumes playback. Calling play( ) after playback has completed
// will restart playback from the beginning of the video.
public function play( ):Void;
// Pauses playback.
public function pause( ):Void;
// Seeks to the given time, specified in seconds. Not applicable to text
ads.
public function seek(time:Number):Void;
// Returns the current play time position in seconds. Not applicable to
// text ads.
```

TABLE 1-continued

```
public function getTime( ):Number;
// Returns the ad video duration in seconds, or undefined if we do not
// know the duration yet. Not applicable to text ads.
public function getDuration( ):Number;
// Resizes the player to the given size. The player display area
// surrounding the video, or transparent window in the case of text ads,
// will take up the full width and height. The actual resulting size of
// the video will depend on its aspect ratio. The player will always
// maintain the correct video aspect ratio regardless of the size of the
// display area. The text banner, along with the size of its text, will
// scale with the size of the window.
public function setSize(width:Number, height:Number):Void;
// Destroys any resources used by the player, including stopping the
// NetStream for the video.
public function destroy( ):Void;
}
```

Table 2 is a listing of an example interface for the Flash file C.SWF 110 that uses the APIs in A.SWF 108 for loading the Flash ad 102 and controlling playback of the Flash ad 102. In this example, "callbackObj" is a Flash object returned by the system 100.

TABLE 2

```
if (callbackObj.success) {
    var adInfo:Object = callbackObj.ads[0];
    var player:MovieClip = adInfo.getAdPlayerMovieClip( );
    player.load( );
    player.play( );
}
```

Table 3 below is a listing of example pseudocode for the Flash file B.SWF 110 that defines APIs for accessing sensitive data associated with the Flash ad 102.

TABLE 3

```
System.security.allowDomain(www.adserver1.com)
// gives the URL of the video
getVideoUrl( )
// gives the URL that is used for reporting stats about an impression
getViewUrl( )
// gives the clickstring used for reporting
getReportingUrl( )
```

The separation of APIs for playing Flash content 102 and APIs for accessing sensitive data related to the Flash content 102 is not limited to processing of Flash advertisements. For example, A.SWF 108 can be used to play a public announcement, such as a video explaining a new health care bill or emergency evacuation procedure, and B.SWF 110 can be used to determine the number of people who have viewed the announcement and evaluate the effectiveness of the announcement. For example, if the announcement was 10 minutes long, but the majority of the viewers stopped the Flash content after 30 seconds, or skipped important segments of the announcement, it would indicate that the public announcement video was not very effective.

As another example, A.SWF 108 can be used to play a feature movie or a television episode, and B.SWF 110 can be used to collect information about viewing patterns, such as which segments of the movie or TV episode were fast forwarded or skipped over, which segments were viewed by the majority of viewers at normal speed, and which segments were viewed repeatedly by the same viewers, etc.

It is important to respect privacy concerns. For example, the Flash files when executed do not collect and/or transmit personally identifiable information without consent of the users.

The first server 126, second server 128, personal computer 122, and publisher server 104 in the example of FIG. 1, are connected to each other by a network 134. The network 134 can, for example, be a local area network (LAN), a wide area network (WAN), the Internet, any other type of network, or any combination of types of networks.

Figure 2:
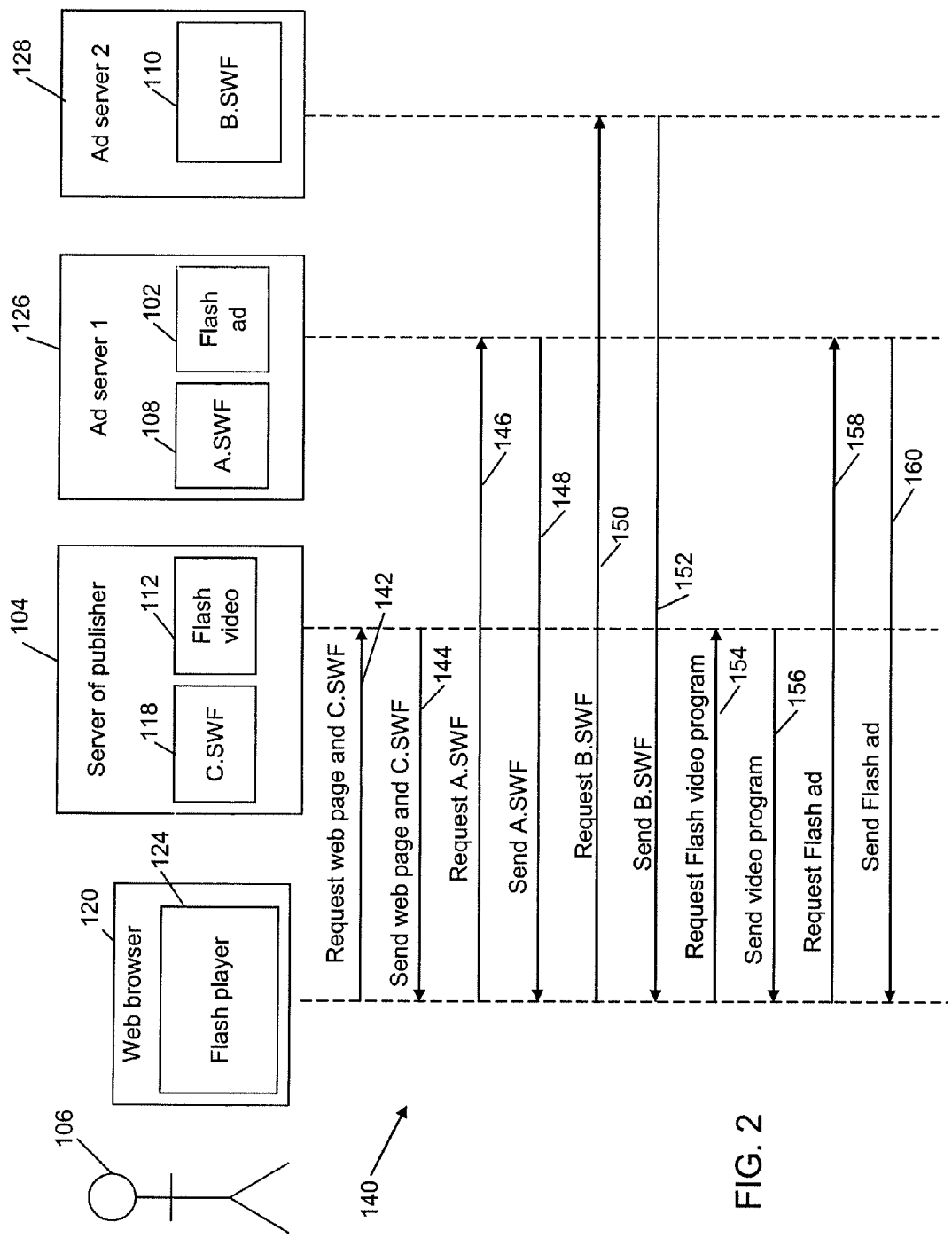
FIG. 2 is a signal flow diagram showing example messages that are passed when playing the Flash content.

FIG. 2 is a signal flow diagram 140 showing example messages that are passed among the web browser 120, the publisher 104, the first ad server 126, and the second ad server 128. Here, "publisher 104" also refers to the server machine of the publisher 104. As an example, the web browser 120 sends an HTTP request to request a web page www.publisher123.com/flash_video that includes an embedded Flash file C.SWF 118 for playing a Flash video program 112 (142). The publisher 104 sends the web page and the Flash file C.SWF 118 to the web browser 120 (144). The Flash file C.SWF 118 includes code that loads the Flash file A.SWF 108.

The web browser 120 loads the Flash player 124. The Flash player 124 executes code in C.SWF 118 and sends a request to the first ad server 126 to request the Flash file A.SWF 108 (146). The ad server 126 sends A.SWF 108 to the Flash player 124 (148). The flash file A.SWF 108 includes code that loads the Flash file B.SWF 110. The Flash player 124 executes code in A.SWF 108 and sends a request to the second ad server 128 to request B.SWF 118 (150). The second ad server 128 sends the Flash file B.SWF 110 to the Flash player 124 (152).

The Flash player 124 executes code in C.SWF 118 and requests the Flash video program 112 (154) from the publisher 104. The publisher 104 streams the Flash video program 112 to the Flash player 124. The Flash file C.SWF includes APIs for controlling playback of the flash video program 112. The Flash player 124 controls playback of the Flash video program 112 using the APIs defined in C.SWF 118. The Flash player 124 uses the first set of APIs 130 defined in A.SWF 108 to request the Flash ad 102 from the first ad server 126 (158). The first ad server 126 streams the Flash ad 102 to the Flash player 124 (160). The Flash player 124 uses the first set of APIs 130 to control playback of the Flash advertisement 102.

The Flash file A.SWF 108 includes code that uses the second set of APIs 132 to report sensitive data associated with the Flash ad 102. The Flash player 124 executes code in A.SWF 108 to use the second set of APIs 132 to report performance data associated with the Flash ad 102 to an advertisement statistics processing engine (not shown) at the second ad server 128. The Flash player 124 may use the second set of APIs 132 to perform sensitive operations, such as adding a count indicating that the Flash ad 102 has been viewed. The performance data can be used by the sponsor of the Flash ad 102 and the operator of an ad network that hosts the Flash ad 102 to improve the ad campaign associated with the Flash ad 102 or improve future ads.

There may be existing library code that can be called by APIs defined in Flash files that use the Security.allowDomain( )method to determine which domains have access to the APIs. The library code may include code for controlling playback of Flash advertisements and code for accessing sensitive data associated with the Flash advertisements. When a single Flash file is used to define APIs for controlling playback of Flash advertisements and APIs for accessing sensitive data associated with the Flash advertisements, using the Security.allowDomain( )method would cause all of the APIs to be exposed to third parties. This is because the Security.allowDomain( )method is an all-or-nothing switch and are not used to open up just a portion of a SWF file to another domain. Since third parties (meaning anyone connected to the Internet) need access to the APIs for controlling playback of the Flash ads, all of the APIs contained in the Flash file are exposed to the third parties. This allows rouge third parties to manipulate or distort the sensitive data, or otherwise use the sensitive data in inappropriate ways.

The Adobe Flash Player platform provides a LocalConnection.allowDomain( ) method that can be used to provide LocalConnection objects that allow limited functionality to clients. Flash files can be written using the LocalConnection.allowDomain( )method to limit access to sensitive data. However, using the LocalConnection.allowDomain( )method may require re-writing the existing library code previously written for Flash files that use the Security.allowDomain( )method. By separating APIs for accessing sensitive data from the APIs needed by third parties for controlling playback of a Flash advertisement, and limiting access to the APIs for accessing the sensitive data, an advertising network can prevent third parties from accessing the sensitive data without re-writing pre-existing library code intended for Flash files that use the Security.allowDomain( )method.

Figure 3:
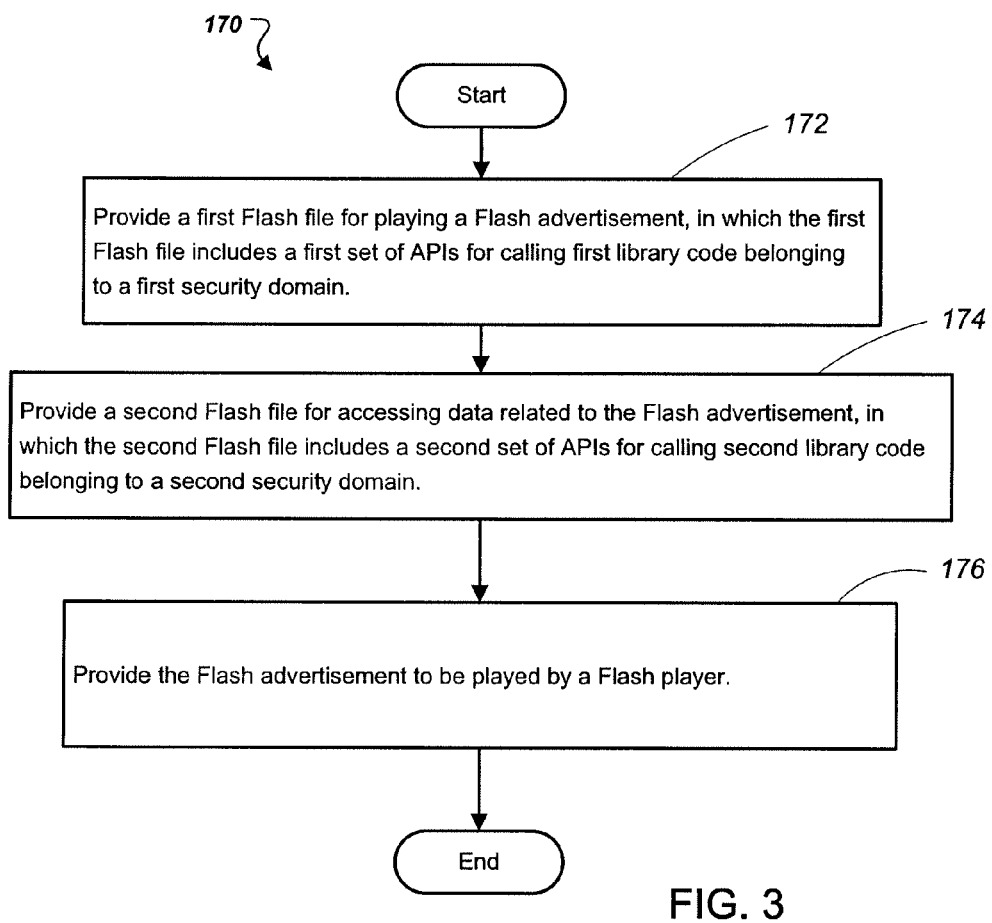
FIGS. 3 and 4 are flow diagrams of example processes for providing Flash advertisements and limiting access to sensitive data associated with the Flash advertisements.

FIG. 3 is a flow diagram of an example process 170 for providing a Flash advertisement and limiting access to sensitive data associated with the Flash advertisement. The process 170 provides a first Flash file for playing a Flash advertisement, in which the first Flash file includes a first set of APIs for calling a first set of library code belonging to a first security domain (172). The first Flash file allows applications in a plurality of domains to use the first set of APIs to call the first library code. For example, the first Flash file can be the Flash file A.SWF 108 (FIG. 1), the first set of APIs can be the APIs 130, and the first security domain can be the domain 114. The Flash advertisement can be a Flash video or animation. For example, the first set of APIs can be used for playing, pausing, or stopping the advertisement, or resizing a display area for showing the advertisement.

The process 170 provides a second Flash file for accessing data related to the Flash advertisement, in which the second Flash file includes a second set of APIs for calling a second set of library code belonging to a second security domain (174). The second Flash file allows only code belonging to the first security domain to use the second set of APIs to call the second set of library code. The process 170 provides the Flash advertisement to be played by a Flash player (176). For example, the second Flash file can be the Flash file B.SWF 110, the second set of APIs can be the APIs 132, and the second security domain can be the domain 116. For example, the second set of APIs can be used for accessing performance statistics of the advertisement, and obtaining an URL of the advertisement. For example, the first and second Flash files can use the Security.allowDomain( )method to determine which domains can access the APIs defined in the Flash files. The first and second Flash files can be SWF files.

In some implementations, the library code for accessing sensitive data are placed in a security domain different from that of the library code used to control playback of a Flash advertisement. A first set of library code for controlling playback of the Flash advertisement 102 is placed at a first security domain, and a second set of library code for accessing sensitive data associated with the Flash advertisement 102 is placed at a second security domain. The second set of library code grants access only to the first security domain. This prevents applications outside of the first and second security domains to access the second set of library code.

Figure 4:
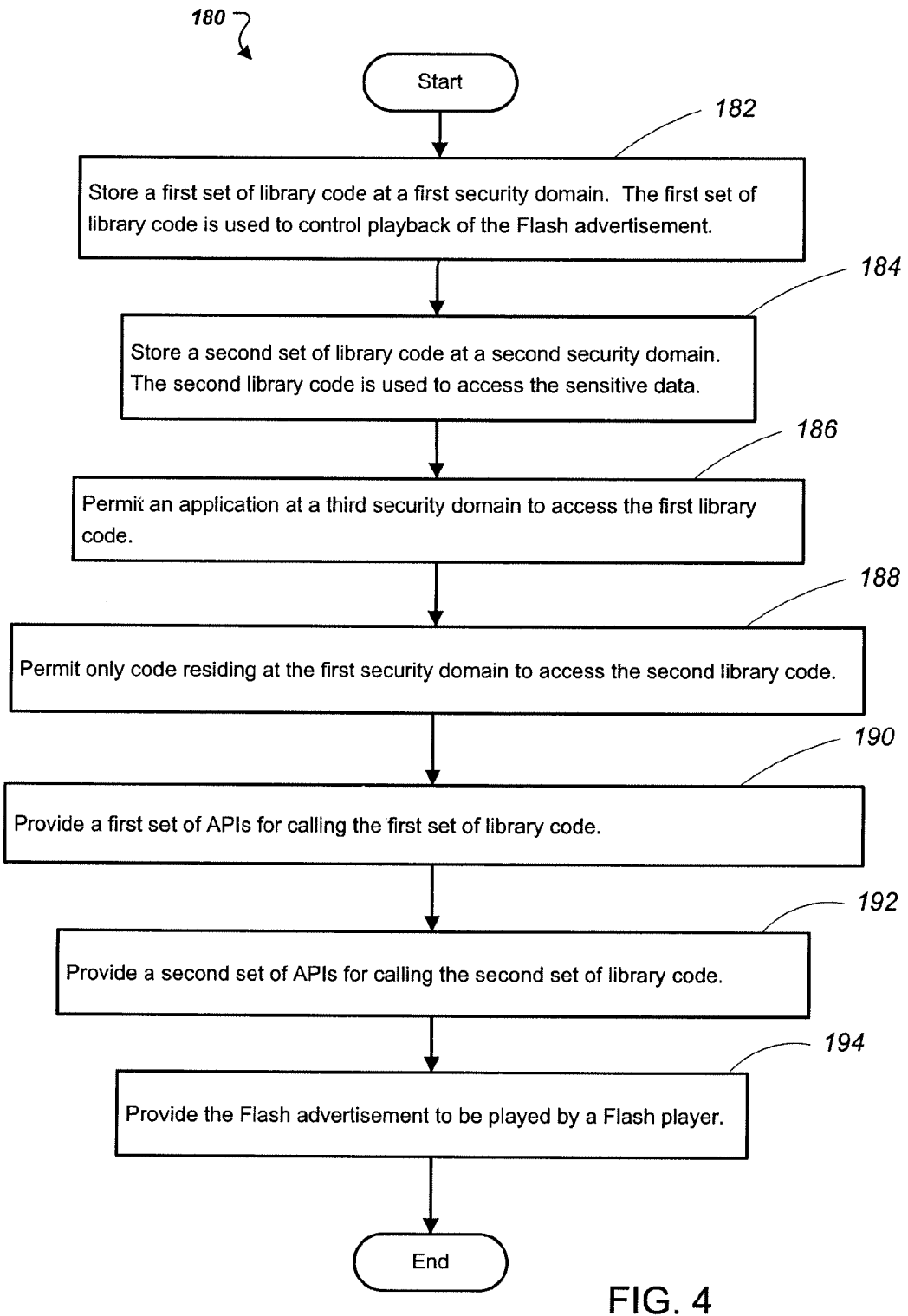

FIG. 4 is a flow diagram of an example process 180 for providing a Flash advertisement and limiting access to sensitive data associated with the Flash advertisement. The process 180 stores a first set of library code at a first security domain (182). The first set of library code is used to control playback of the Flash advertisement. For example, the first security domain can be the domain 114, and the Flash advertisement can be the Flash ad 102. The process 180 stores a second set of library code at a second security domain (184). The second library code is used to access the sensitive data. For example, the second security domain can be the domain 116. The process 180 permits an application at a third security domain to access the first library code (186). For example, the application can be C.SWF 118, and the third security domain can be the domain where the publisher 104a is located. The process 180 permits only code residing at the first security domain to access the second library code (188). For example, A.SWF 108 can access the second library code, but C.SWF 118 cannot access the second library code.

The process 180 provides a first set of APIs for calling the first set of library code (190). For example, the first set of APIs can be the APIs 130. The Flash file C.SWF 118 can use the first set of APIs 130. The process 180 provides a second set of APIs for calling the second set of library code (192). For example, the second set of APIs can be the APIs 132. The Flash file A.SWF 108 can access the second set of APIs, but C.SWF 118 cannot access the second set of APIs. The process 180 provides the Flash advertisement to be played by a Flash player (194).

Figure 5:
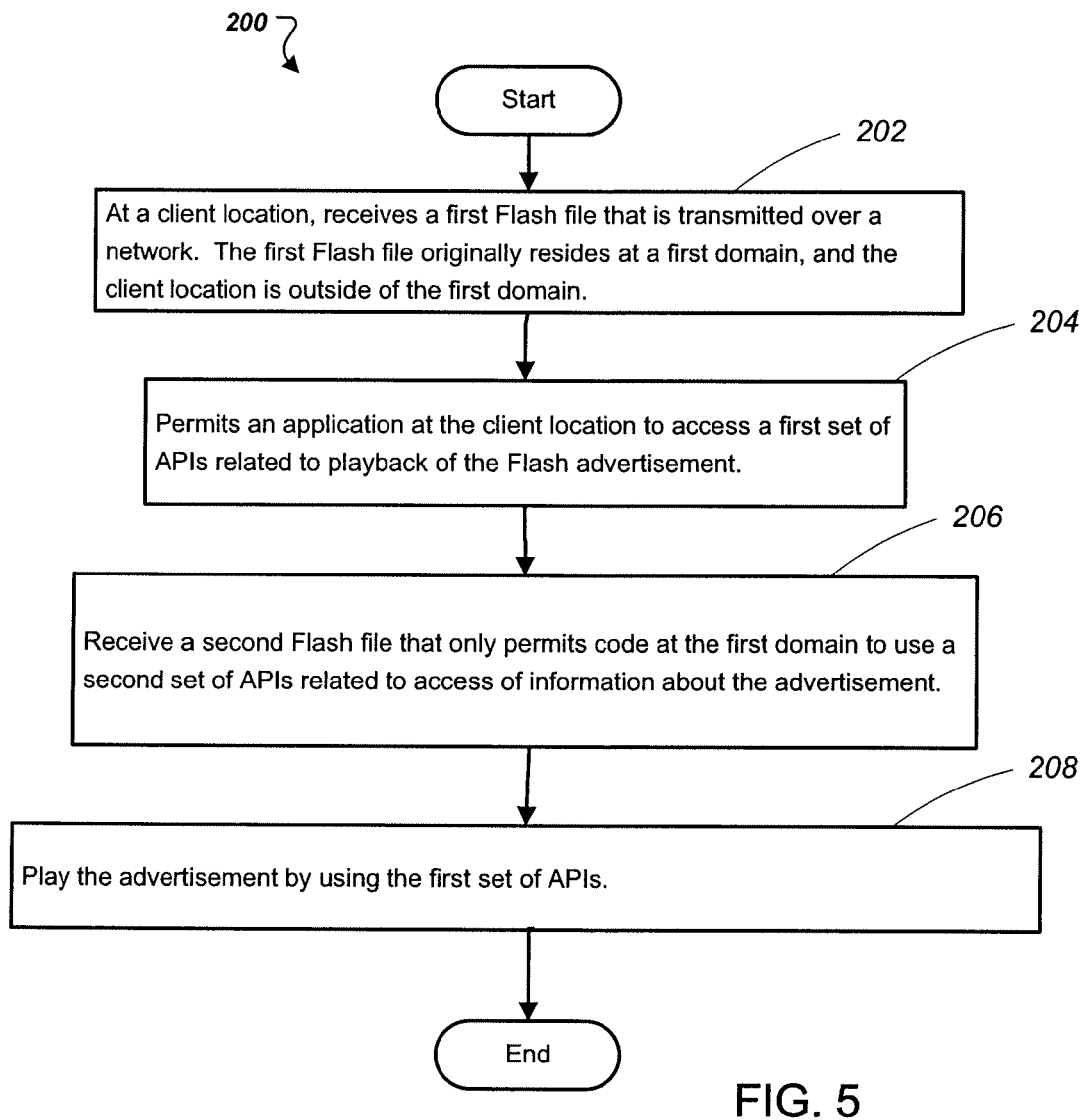
FIG. 5 is a flow diagram of an example process for playing a Flash advertisement while not accessing sensitive data associated with the advertisement.

FIG. 5 is a flow diagram of an example process 200 for playing a Flash advertisement while not accessing sensitive data associated with the advertisement. At a client location, the process 200 receives a first Flash file that is transmitted over a network, in which the first Flash file originally resides at a first domain, and the client location is outside of the first domain (202). For example, the client location can be at the location of the consumer 106, the first flash file can be A.SWF 130, and the first domain can be the domain 114.

The process 200 permits an application at the client location to access a first set of APIs related to playback of the Flash advertisement (204). For example, the application can be C.SWF 118, and the first set of APIs can be the APIs 130. The process 200 receives a second Flash file that permits only code at the first domain to use a second set of APIs used for accessing information about the advertisement (206). For example, the second Flash file can be B.SWF 110. The process 200 plays the advertisement by using the first set of APIs (208). For example, C.SWF 118 uses the first set of APIs to play the Flash advertisement, but cannot use the second set of APIs to access information about the ad.

Figure 6:
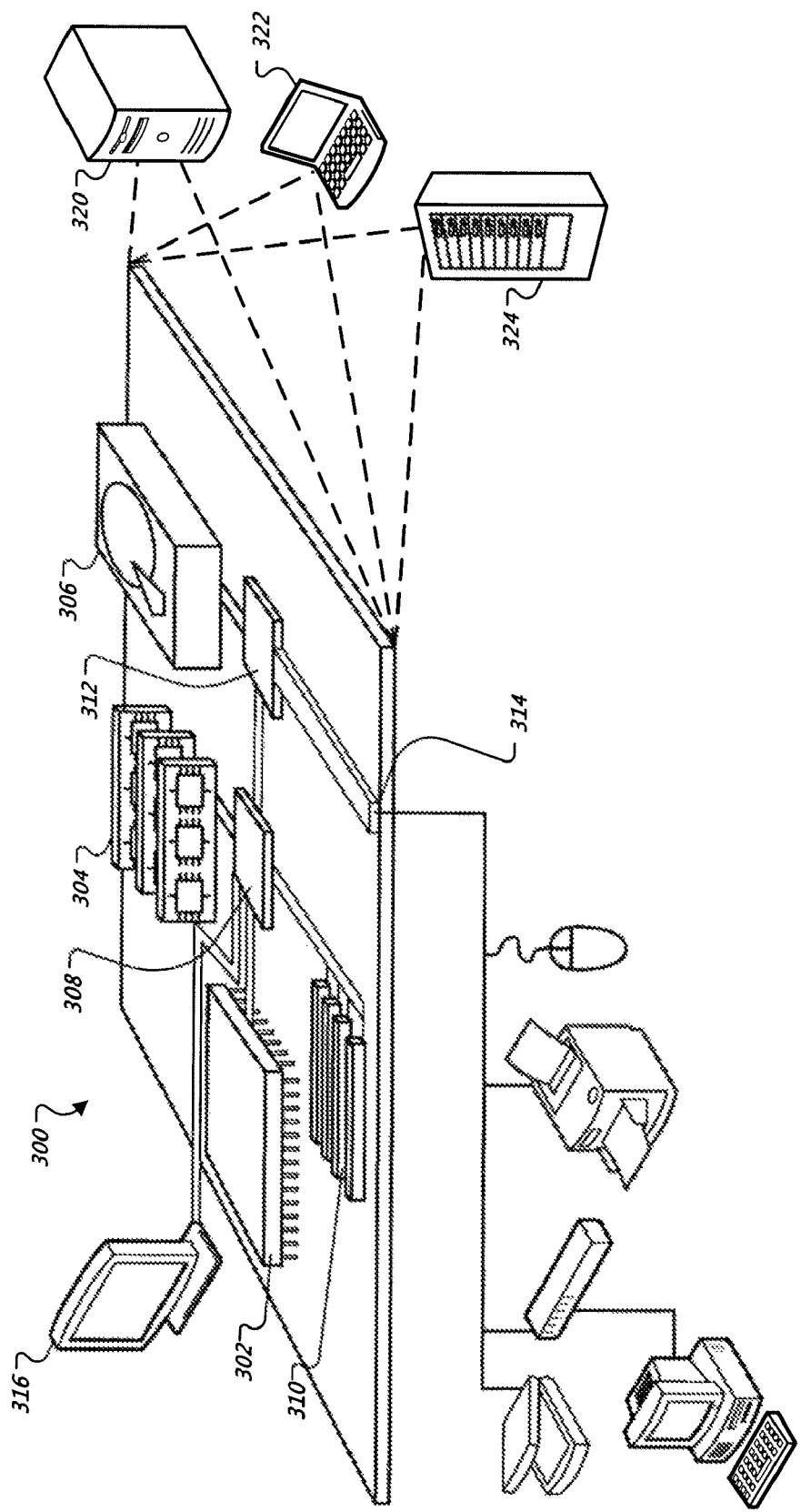
FIG. 6 is a schematic representation of a general computing system.

FIG. 6 is a schematic representation of a general computing system 300 that can be used to implement the system 100. Computing device 300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various buses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, memory on processor 302, or a propagated signal.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Each of such devices (e.g., standard server, rack server system, personal computer, laptop computer) may contain one or more of computing device 300, and an entire system may be made up of multiple computing devices 300 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated.

Different types of user interfaces can be used. The server 126 and server 128 can reside within a single machine that have multiple network interfaces, each network interface corresponding to a separate domain.

In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
providing a Flash advertisement and limiting access to sensitive data associated with the Flash advertisement, including:
storing first library code for controlling playback of the Flash advertisement and second library code for accessing the sensitive data separately at two different security domains, where a first server associated with a first security domain of the two different security domain stores the first library code and additional code for accessing the second library code stored at a second different server associated with a second different security domain of the two different security domains;
permitting an application at a third different security domain to access the first library code residing at the first security domain; and
permitting only the additional code residing at the first security domain to access the second library code residing at the second different security domain.

2. The method of claim 1, comprising providing a first set of application programming interfaces (APIs) for calling the first library code, and permitting applications at the third different security domain to use the first set of APIs.

3. The method of claim 1, comprising providing a second set of APIs for calling the second library code, and permitting only applications at the first security domain to use the second set of APIs to call the second library code.

4. The method of claim 3 wherein permitting only applications at the first security domain to use the second set of APIs comprises using a Security.allowDomain( )method to permit only applications belonging the first security domain to use the second set of APIs.

5. The method of claim 1 wherein the second library code comprises code for reporting performance statistics of the advertisement.

6. The method of claim 1 wherein providing the Flash advertisement comprises streaming a video advertisement.

7. A computer-implemented method comprising:
providing, to a client device, a first Flash file for playing a Flash advertisement, the first Flash file comprising a first set of application programming interfaces (APIs) for calling first library code belonging to a first security domain, the first library code controlling playback of the Flash advertisement, the first Flash file allowing applications in a plurality of domains to use the first set of APIs to call the first library code, the first Flash file further including first additional code for loading to the client device a second Flash file for accessing sensitive data related to the Flash advertisement, the second Flash file comprising a second set of APIs for calling second library code belonging to a second different security domain, the second Flash file allowing only code belonging to the first security domain to use the second set of APIs to call the second library code, and the first security domain further storing second additional code for accessing the second library code stored at the second different security domain using the second set of APIs; and
providing the second Flash file for accessing the sensitive data related to the Flash advertisement to the client device.

8. The method of claim 7 wherein the first Flash file comprises an API for at least one of playing, pausing, or stopping the advertisement, or resizing a display area for showing the Flash advertisement.

9. The method of claim 7 wherein the second Flash file comprises an API for accessing performance statistics of the Flash advertisement.

10. The method of claim 7 wherein the second Flash file comprises an API for accessing an URL of the Flash advertisement.

11. The method of claim 7 wherein the advertisement comprises at least one of video or animation.

12. The method of claim 7 wherein providing the first and second Flash files comprises providing SWF files.

13. An apparatus for providing a Flash advertisement and limiting access to sensitive data associated with the Flash advertisement, comprising:
a first server hosting first library code for controlling playback of the Flash advertisement, the first server belonging to a first security domain, the first library code being accessible using a first set of application programming interfaces (APIs); and
a second different server hosting second library code for accessing the sensitive data associated with the Flash advertisement, the second different server belonging to a second different security domain, the second library code being accessible using a second set of APIs, the second library code permitting only code belonging to the first security domain to use the second set of APIs to call the second library code, where the first server is configured to provide, by one or more processors, to a client device a first Flash file comprising the first set of APIs and first additional code for loading to the client device a second Flash file comprising the second set of APIs, and where the first server further stores second additional code for accessing the second library code hosted on the second different server using the second set of APIs.

14. The apparatus of claim 13 wherein the first set of APIs comprises an API for at least one of playing, pausing, or stopping the Flash advertisement.

15. The apparatus of claim 13 wherein the first set of APIs comprises an API for resizing a display area for showing the Flash advertisement.

16. The apparatus of claim 13 wherein the second set of APIs comprises an API for accessing performance statistics of the Flash advertisement.

17. The apparatus of claim 13 wherein the second set of APIs comprises an API for accessing a count value representing a number of times that the advertisement has been viewed.

18. The apparatus of claim 13 wherein the first Flash file comprises code for causing code in the first library code to call the second set of APIs to access data related to the Flash advertisement.

19. The apparatus of claim 13 wherein the Flash advertisement comprises at least one of a video or an animation.

20. The apparatus of claim 13 wherein the first and second Flash files comprise SWF files.

21. The apparatus of claim 13 wherein the first server and the second different server resides in a single machine.

* * * * *